June 1, 1965  T. W. HOWLETT, JR  3,186,769
PUMPING SYSTEM
Filed Feb. 1, 1962

INVENTOR.
Thomas W. Howlett, Jr.,
BY
Byron, Hume, Groen + Clement
Attys 3,186,769
PUMPING SYSTEM
Thomas W. Howlett, Jr., Highland, Ind., assignor to Union Tank Car Company, Chicago, Ill., a corporation of New Jersey
Filed Feb. 1, 1962, Ser. No. 170,349
9 Claims. (Cl. 302—17)

The invention relates to a system for transporting solid, particulate material and, more particularly, to a gas pumping system for moving solid, particulate material from one location to another.

In the past, two methods have generally been employed to move solid, particulate material, such as sand, volcanic rock or the like, between relatively close locations. One method has been to use a belt or bucket mechanical conveyor. When the belt mechanical conveyor is employed, machinery or human labor is necessary to place the solid particles upon the belt conveyor. The bucket mechanical conveyor generally is capable of scooping the solid, particulate material from the storage pile or the like and transporting it to the desired location.

The second method generally employed to move solid, particulate material is to create a pressure differential between the source of the solid, particulate material and the location to which the particulate material is being moved. For example, if the solid, particulate material is being moved from a first storage tank to a second storage tank, the two storage tanks are connected by a pipe and a partial vacuum created in the second storage tank. The pressure differential between the two storage tanks forces the solid, particulate material from the first storage tank through the pipe into the second storage tank. Conversely, the first storage tank may be pressurized to force the solid, particulate material from the first storage tank through the pipe into the second storage tank.

Although these methods are reasonably successful, they have inherent limitations which detract from their economy and flexibility of application. For example, the transporting method employing the mechanical conveyor belt requires additional machinery or manpower to place the solid, particulate material upon the belt. The bucket and belt conveyors are inherently limited by their construction to moving the particulate material over a relatively straight course. Thus, if the course of travel from the source of the particulate material to the place it is being transported is not a substantially straight line then a plurality of conveyors must be used. Furthermore, if the distance the particulate material is to be moved is greater than about thirty feet, more than one conveyor belt is generally necessary, since portable conveyors are not made much longer than this length.

The pressure differential method is not capable of transporting per unit time large quantities of solid, particulate material. Furthermore, if the particulate material is fragile, such as expanded, particulate volcanic rock, this method causes the particulate material to be broken into smaller particles.

It is therefore desirable to provide a system for transporting solid, particulate material from one area to another, which system is versatile in use, economical to operate, and has the capacity to transport per unit time large quantities of solid, particulate material without any substantial damage to the particulate material.

It is an object of the present invention to provide a particulate material transporting system that obviates the undesirable features of the above-described prior art systems.

It is a further object of the present invention to provide a system for transporting solid, particulate material from one location to another.

It is a further object of the present invention to provide for transporting solid, particulate material a gas pumping system which requires a minimum amount of machinery and a minimum amount of manpower to operate.

It is a further object of the present invention to provide a gas pumping system for transporting solid, particulate material from one location to another, which system has a large capacity per unit time.

It is a further object of the present invention to provide a system for transporting solid, particulate material, which system has a variety of applications.

It is a further object of the present invention to provide for transporting solid, particulate material from one location to another a system having substantially no detrimental effect on the particulate material transported.

These and other objects, which will be more apparent hereinafter, are accomplished by the pumping system of the present invention. This system enables the transportation of large quantities of solid, particulate material per unit time from one area to another without substantial damage to the solid, particulate material. A minimum amount of machinery is required and it is readily operated with a minimum amount of manpower. In addition, the pumping system has a minimum number of moving parts thereby minimizing operational expenditures and repairs and is adapted to be used in a variety of applications.

The invention, both as to its organization and method of operation, taken with further objects and advantages thereof, will best be understood by reference to the following description taken in connection with the accompanying drawings, in which.

Figure 1:
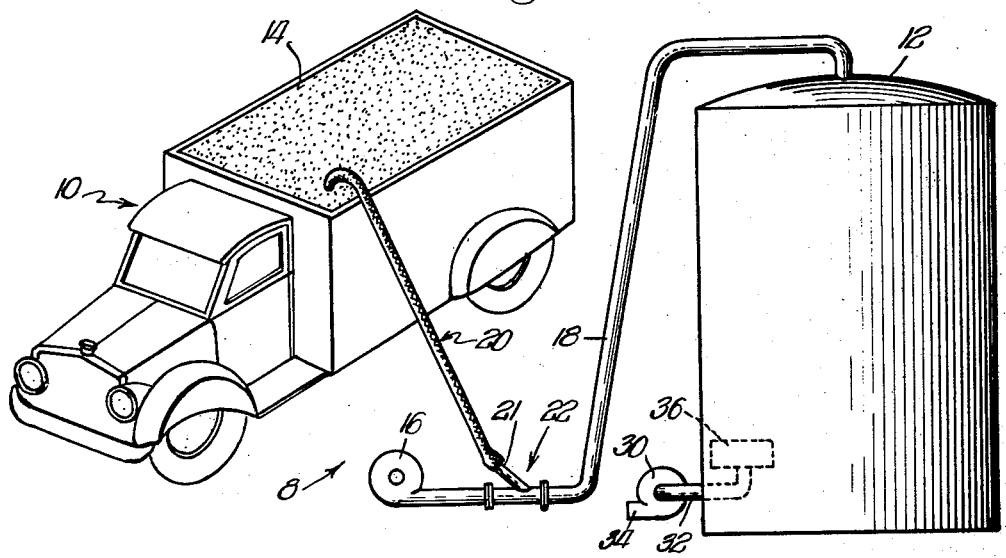
FIG. 1 is a schematic perspective view illustrating the pumping system of the present invention as applied to move solid, particulate material from a truck to a storage tank.

Referring now to the drawings, and more particularly to FIG. 1, a pumping system 8 embodying the features of the present invention is illustrated for transporting solid, particulate material 14, such as sand, powdered volcanic rock or the like, from a truck 10, for example, to a storage tank 12, for example. The pumping system 8 is adapted to expeditiously and economically transport this particulate material 14 from the truck 10 to the storage tank 12 without significant damage or disintegration of the solid, particulate material 14.

The pumping system 8 includes a blower 16, the outlet of which is cooperatively connected to a transporting pipe 18 through a venturi arrangement indicated generally by reference numeral 22. The blower 16, venturi arrangement 22 and the transporting pipe 18 are suitably connected by flanges or the like. Any intake section 21 of the venturi arrangement 22 communicates with an inlet pipe 20. Actuation of the blower 16 causes particulate material 14 to be drawn from the truck 10 into the inlet pipe 20, in a manner more apparent hereinafter, through the venturi arrangement 22 and the transporting pipe 18 to the storage tank 12.

The venturi arrangement 22 is made of metal pipe or tubing. The inlet pipe 20 is preferably made of flexible rubber tubing or the like as illustrated in FIG. 1. This affords added versatility to the use of the pumping system 8, though it will be understood that if the pumping system 8 is to be permanently installed the inlet pipe 20 may be constructed entirely of metal pipe or tubing. In like manner, the transporting pipe 18 may be composed of flexible rubber tubing or the like. However, in FIG. 1 the transporting pipe 18 of the pumping system is permanently installed and therefore made of metal pipe or the like.

Figure 2:
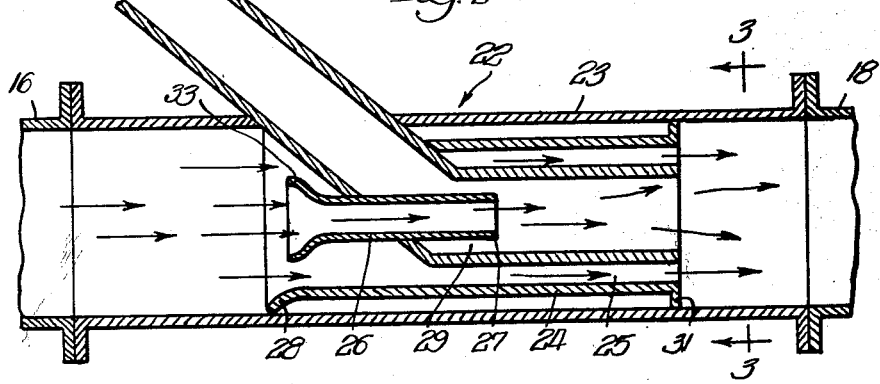
FIG. 2 is a fragmentary cross-sectional view of a venturi arrangement of the pumping system illustrated in FIG. 1.
Figure 3:
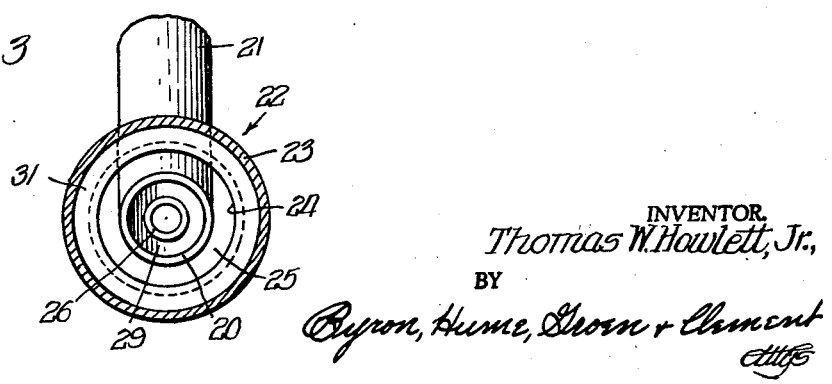
FIG. 3 is a cross-sectional view of the venturi arrangement taken along lines 3—3 of FIGURE 2.

When the pumping system 8 is actuated, the venturi arrangement 22, illustrated in detail in FIGS. 2 and 3, has a "push-pull effect" upon the solid, particulate material 14. The venturi arrangement 22 draws the solid, particulate material 14 therein, one venturi tube 26 functioning to push the solid, particulate material 14 into the transporting pipe 18, another venturi tube 24 functioning to pull the solid, particulate material 14 through the transporting pipe 18 to the storage tank 12. The term "venturi tube" as used herein refers to tubes with an upstream or inlet opening having a greater cross-sectional area than the cross-sectional area of their downstream or outlet opening.

To these ends, the venturi arrangement 22 includes an outer cylindrical pipe 23 adapted to be connected to the blower 16 and the transporting pipe 18 by means of flanges or the like. The two annular venturi tubes 24 and 26 are cylindrically shaped and positioned substantially concentrically within the outer pipe 23. At its ends the venturi tube 24 has an outwardly flaring flange 28 and a positioning flange 31. These flanges 28 and 31 support the venturi tube 24 and are secured to the pipe 23 by welding or the like. The flaring flange 28 forms an upstream inlet which is substantially as large as the interior cross-sectional area of the pipe 23. The downstream or outlet opening of the venturi tube 24 is smaller than the cross-sectional area of the pipe 23, but large enough to allow the intake section to fit therein.

The intake section 21 extends into the pipe 23 and the venturi tube 24, one end of the intake section 21 being concentric with the pipe 23 and the venturi tube 24 and forming with the venturi tube 24 an annular zone 25. This end of the intake section 21 extends downstream and terminates at substantially the same point as the downstream end of the venturi tube 24. The pipe 23 and venturi tube 24 are provided with suitable holes through which the intake section 21 passes for this construction. The section 21 is held in this position by welding it to the pipe 23 and tube 24 or by any other suitable means.

The venturi tube 26 is smaller than the venturi tube 24 and communicates with and extends into the intake section 21. It forms therewith a small annular zone 29 which terminates within the concentric portion of the inlet section 21. The inlet or upstream end 33 of the venturi tube 24 has a greater cross-sectional area than the cross-sectional area of its outlet or downstream end 27. The upstream end 33 of the venturi tube 24 is positioned downstream of the upstream end of the venturi tube 24 and the downstream end 27 is preferably as far away from the interior end of the intake section 21 as is convenient. The venturi tube 26 is suitably secured by welding or the like to the intake section 21.

When the blower 16 is actuated it forces air through the tube 18 in a direction indicated by the arrows in FIG. 2. The flow of air through the venturi tubes 24 and 26 creates areas of reduced pressure at the downstream ends of the annular zones 25 and 29, respectively. The reduced pressure at both of these annular zones 29 and 25 acts together to create a suction through the intake pipe 21 to the inlet pipe 20 whereby the solid, particulate material 14 is drawn into the venturi arrangement 22. Specifically, once the solid particulate material 14 has been drawn into the concentric portion of the intake section 21 and passes the downstream end 27 of the venturi tube 26, the air from the venturi tube 26 pushes the material 14 into the pipes 23 and 18 and the air from the venturi tube 24 pulls it through these pipes into the storage tank 12. The coacting effect of these two areas of reduced pressure therefore increases the amount of particulate material 14 brought into the transporting pipe 18 and permits the transfer of a large amount of solid, particulate material 14 per unit time under relatively low air velocities in the transporting pipe 18. In this manner, damage to any fragile solid, particulate material being transferred is substantially reduced because the lower the velocity of the gas in the transporting pipe 18 the less possible damage to the particulate material 14.

As seen in FIG. 1, the storage tank 12 is equipped with a blower 30 having its intake pipe 32 communicating with the interior of the storage tank 12 and its outlet or exhaust opening 34 communicating with the exterior of the storage tank 12. In this manner when the blower 30 is actuated during the transfer of solid, particulate material 14 from the truck 10 to the storage tank 12 the air being pumped into the storage tank 12 is removed by the blower 30. A filter 36 on the end of the intake pipe 32 prevents the particulate material 14 from entering the intake pipe 32 and the blower 30.

It will be understood that the present invention may be employed in pumping or transporting many different types of solid, particulate material, such as sand, powdered volcanic rock and the like, and that it may be employed to transport such solid, particulate materials from a truck, storage tank, storage bin and the like to a truck, storage bin, storage tank or the like depending upon the application.

While the embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. In a pumping system for transporting solid, particulate materials from one place to another including an inlet pipe communicating with a transporting pipe and means for forcing a gas through said transporting pipe, the improvement comprising said inlet pipe having an end which communicates with said transporting pipe, said end of said inlet pipe being positioned within a first venturi tube in said transporting pipe and a second venturi tube within said transporting tube having a downstream end communicating with said end of said inlet pipe, said second venturi tube and said end of said inlet pipe being concentrically positioned with respect to said first venturi tube, said end of said inlet pipe terminating downstream of said downstream end of said second venturi tube.

2. The pumping system of claim 1 wherein said end of said inlet pipe and said first and second venturi tubes are concentrically aligned within said transporting pipe.

3. In the pumping system of claim 1 wherein said means for forcing a gas through said transporting pipe is upstream of said first and second venturi tubes thereby forcing a gas through said first and second venturi tubes.

4. In a pumping system for transporting solid, particulate materials from one place to another including an inlet pipe communicating with a transporting pipe and means for forcing a gas through said transporting pipe, the improvement comprising said inlet pipe having an end which terminates inside said transporting pipe, said end being positioned substantially concentrically within said transporting pipe, a first venturi tube within said transporting pipe surrounding said end of said inlet pipe and forming an annular zone therewith, and a second venturi tube positioned within said transporting pipe and having a downstream end communicating with said inlet pipe and forming an annular zone therewith, said downstream end of said second venturi tube being upstream of where said end of said inlet pipe terminates inside said first venturi tube.

5. The pumping system of claim 4 wherein said first venturi tube and said second venturi tube are positioned within said transporting pipe in substantially concentric alignment therewith.

6. In the pumping system of claim 5 wherein said means for forcing a gas through said transporting pipe is upstream of said first and second venturi tubes thereby forcing a gas through said first and second venturi tubes.

7. In a pumping system for transporting solid, particulate materials from one place to another including an inlet pipe, a transporting pipe and means for forcing a gas through said transporting pipe, the improvement comprising a venturi arrangement including a pipe section having an upstream end communicating with said means for forcing a gas and a downstream end communicating with said transporting pipe, an intake section having an upstream end and a downstream end, said downstream end of said intake section extending downstream into said pipe section, said upstream end of said intake section communicating with said inlet pipe, said downstream end of said intake section being positioned within a first venturi tube which terminates at substantially the same point as said downstream end of said intake section within said pipe section, a second venturi tube within said pipe section and said first venturi tube, said second venturi tube having a downstream end communicating with said downstream end of said intake section, said downstream end of said second venturi tube terminating upstream of the downstream end of said first venturi tube and the downstream end of said intake section.

8. In the pumping system of claim 7 wherein said first and second venturi tubes are concentrically positioned within said pipe section, said downstream end of said intake section is concentrically positioned within said pipe section, and said second venturi tube having an upstream end which is downstream of an upstream end of said first venturi tube.

9. In the pumping system of claim 8 wherein said means for forcing a gas through said transporting pipe is upstream of said first and second venturi tubes thereby forcing a gas through said first and second venturi tubes.

References Cited by the Examiner
UNITED STATES PATENTS

| | | | |
|---|---|---|---|
| 1,211,310 | 1/17 | Griffin | 302—59 |
| 1,428,796 | 9/22 | Micon. | |
| 2,060,629 | 11/36 | McJoynt | 226—43 |
| 2,372,957 | 4/45 | Keefer | 51—12 |
| 2,695,265 | 11/54 | Degnen | 302—25 |

SAMUEL F. COLEMAN, *Primary Examiner.*

ANDRES H. NIELSEN, *Examiner.*